(12) United States Patent
Mansour

(10) Patent No.: US 8,239,236 B2
(45) Date of Patent: Aug. 7, 2012

(54) METHOD AND SYSTEM FOR SCHEDULING A MEETING FOR A SET OF ATTENDEES VIA A SPECIAL ATTENDEE

(75) Inventor: Steve Mansour, Milpitas, CA (US)

(73) Assignee: AOL Inc., Dulles, VA (US)

(*) Notice: Subject to any disclaimer, the term of this patent is extended or adjusted under 35 U.S.C. 154(b) by 87 days.

(21) Appl. No.: 13/051,207

(22) Filed: Mar. 18, 2011

(65) Prior Publication Data

US 2011/0167356 A1    Jul. 7, 2011

Related U.S. Application Data

(60) Division of application No. 12/627,902, filed on Nov. 30, 2009, now Pat. No. 7,912,745, which is a continuation of application No. 10/155,625, filed on May 23, 2002, now Pat. No. 7,865,387.

(51) Int. Cl.
    *G06Q 10/00*  (2012.01)
(52) U.S. Cl. .............. 705/7.19; 705/7.13; 705/7.16; 705/7.18
(58) Field of Classification Search .......... 705/7.13, 705/7.16, 7.18, 7.19
    See application file for complete search history.

(56) References Cited

U.S. PATENT DOCUMENTS

| | | | |
|---|---|---|---|
| 4,807,154 A | 2/1989 | Scully et al. | |
| 4,807,155 A | 2/1989 | Cree et al. | |
| 4,817,018 A | 3/1989 | Cree et al. | |
| 4,819,191 A | 4/1989 | Scully et al. | |
| 4,831,552 A | 5/1989 | Scully et al. | |
| 4,866,611 A | 9/1989 | Cree et al. | |
| 4,977,520 A | 12/1990 | McGaughey, III et al. | |
| 5,023,851 A | 6/1991 | Murray et al. | |
| 5,124,912 A | 6/1992 | Hotaling et al. | |
| 5,129,057 A | 7/1992 | Strope et al. | |
| 5,261,045 A | 11/1993 | Scully et al. | |
| 5,457,476 A | 10/1995 | Jenson | |
| 5,748,907 A * | 5/1998 | Crane | 705/2 |

(Continued)

FOREIGN PATENT DOCUMENTS

EP    0 323 703    7/1989

(Continued)

OTHER PUBLICATIONS

Syroid and Leuf, Outlook 2000 in a Nutshell, O'Reilly Media, Inc., May 2, 2000 (online reprint p. 1-28).*

(Continued)

*Primary Examiner* — Justin M Pats
(74) *Attorney, Agent, or Firm* — Finnegan, Henderson, Farabow, Garrett & Dunner, L.L.P.

(57) ABSTRACT

A method for scheduling a meeting for a set of recipients is provided. The set of recipients includes a special attendee and at least one additional attendee including a meeting organizer. The method includes obtaining an initial meeting request from the meeting organizer. The meeting request does not specify meeting commencement information corresponding to at least one of a start time and a date. The method also includes generating a user interface for displaying the initial meeting request to the special attendee. The method also includes collecting input designated by the special attendee from the user interface. The input specifies the meeting commencement information. The method further includes transmitting the collected input. The collected input is used to generate an updated meeting request designating the set of recipients and specifying the meeting commencement information.

15 Claims, 2 Drawing Sheets

U.S. PATENT DOCUMENTS

| | | | |
|---|---|---|---|
| 5,948,040 | A | 9/1999 | DeLorme et al. |
| 5,960,406 | A | 9/1999 | Rasansky et al. |
| 6,018,343 | A | 1/2000 | Wang et al. |
| 6,035,278 | A * | 3/2000 | Mansour ............... 705/7.19 |
| 6,047,260 | A * | 4/2000 | Levinson ............... 705/7.15 |
| 6,092,067 | A | 7/2000 | Girling et al. |
| 6,111,572 | A | 8/2000 | Blair et al. |
| 6,216,110 | B1 | 4/2001 | Silverberg |
| 6,266,814 | B1 | 7/2001 | Lemmons et al. |
| 6,275,810 | B1 | 8/2001 | Hetherington et al. |
| 6,278,456 | B1 | 8/2001 | Wang et al. |
| 6,345,260 | B1 * | 2/2002 | Cummings et al. ........ 705/7.19 |
| 6,594,637 | B1 * | 7/2003 | Furukawa et al. ........ 705/7.16 |
| 6,654,457 | B1 * | 11/2003 | Beddus et al. ........ 379/265.02 |
| 6,687,678 | B1 * | 2/2004 | Yorimatsu et al. ........ 705/7.12 |
| 6,826,551 | B1 * | 11/2004 | Clary et al. ............... 706/46 |
| 7,082,402 | B2 * | 7/2006 | Conmy et al. ............ 705/7.19 |
| 7,108,173 | B1 * | 9/2006 | Wang et al. ............... 235/377 |
| 7,174,303 | B2 * | 2/2007 | Glazer et al. ............ 705/7.19 |
| 7,177,905 | B1 | 2/2007 | Slutsman et al. |
| 7,188,073 | B1 | 3/2007 | Tam |
| 7,283,970 | B2 * | 10/2007 | Cragun et al. ............ 705/7.19 |
| 7,587,327 | B2 * | 9/2009 | Jacobs et al. ............ 705/7.14 |
| 2001/0027481 | A1 | 10/2001 | Whyel |
| 2001/0054072 | A1 | 12/2001 | Discolo et al. |
| 2002/0035493 | A1 | 3/2002 | Mozayeny et al. |
| 2003/0036941 | A1 | 2/2003 | Leska et al. |
| 2003/0195774 | A1 * | 10/2003 | Abbo ............... 705/3 |
| 2005/0027580 | A1 * | 2/2005 | Crici et al. ............... 705/8 |
| 2008/0183563 | A1 * | 7/2008 | Raffel et al. ............... 705/10 |

FOREIGN PATENT DOCUMENTS

| | | |
|---|---|---|
| EP | 0 276 424 | 11/1993 |
| EP | 0 276 425 | 11/1993 |
| EP | 0 276 426 | 11/1993 |
| EP | 0 276 428 | 11/1993 |
| EP | 0 276 429 | 11/1993 |
| EP | 0 326 778 | 9/1996 |
| EP | 1 122 672 | 8/2001 |

OTHER PUBLICATIONS

Padwick and Feddema, Special Edition Using Microsoft Outlook 2000, Que Publishing, May 12, 1999 (online reprint p. 1-17).*

Bott and Leonhard, Special Edition using Microsoft Office 2000, Que Publishing, 1999, p. 772-78 (online reprint p. 1-12).*

Muna, message to mailing list, [lmc-richmond] coordinating schedules=meetings, lists.indymedia.org, Sep. 2001, http://archives.lists.indymedia.org/ imc-richmond/2001-September/000306.html.*

Turn-O-Matic, Take a Number Systems, Turn-O-Matic, retrieved from web.archive.org, Oct. 25, 2001, http://web.archive.org/web/20011025045226/ takeanumbersystems.com/take.asp.*

*A Groupware Environment for Complete Meetings*; Ted O'Grady and Saul Greenberg; The University of Calgary.

*Cognitive Modeling and Group Adaption in Intelligent Multi-Agent Meeting Scheduling*; Leonardo Garrido, Ramon Brena, and Katia Sycara.

*Office Monitor*; Nicole Yankelovich and Cynthia D. McLain; CHI 1996 Conference on Human Factors in Computing Systems; Apr. 14-18, 1996.

*A Non-Manipulable Meeting Scheduling System*; Eithan Ephrati, Gilad Zlotkin, and Jeffery S. Rosenschein.

*Multi-Agent Meeting Scheduling: Preliminary Experimental Results*; Leonardo Garrido and Katia Sycara.

*Winning the PC Shell Game*; K. F. Rudd and J. D. Levy; Today's Office; Jan. 1989.

*An Automated Distributed Meeting Schedule*; Sandip Sen; Department of Mathematical & Computer Sciences; University of Tulsa.

*Satisfying User Preferences While Negotiating Meetings*; Sandip Sen, Thomas Haynes, and Neeraj Arora; Department of Mathematical & Computer Sciences; The University of Tulsa.

*A Formal Study of Distributed Meeting Scheduling*; Sandip Sen and Edmund H. Durfee.

Bee Staff Reports, Governor wants to meet with refugee leaders, Modesto Bee, Mar. 5, 1989, p. 2B.

Take a Number Systems, Turn-O-Matic, retrieved from web.archive.org, Oct. 25, 2001, http://web.archive.org/web/20011025045226/takeanumbersystems.com/take.asp.

Cybozu Office 4 Support, http://www.share360.com/support/office4/manuals/Updates_-_Linux.all.html (product publicly available as of Mar. 13, 2002).

Padwick and Feddema, Using Microsoft Outlook 2000, Que Publishing, May 12, 1999, p. 1-93.

Bott and Leonhard, Special Edition using Microsoft Office 2000, Que Publishing, 1999, p. 772-78.

Muna, message to mailing list, [lmc-richmond] coordinating schedules=meetings, lists.indymedia.org, Sep. 2001, http://archives.lists.indymedia.org/imc-richmond/2001-September/000306.html.

Syroid and Leuf, Outlook 2000 in a Nutshell, O'Reilly Media, Inc., May 2, 2000 (online reprint p. 1-15).

US 5,749,074, 05/1998, Kasso et al. (withdrawn)

* cited by examiner

FIG. 2

Calendar (10)

| | THU 1 |
|---|---|
| | GREAT AMERICA OFFSITE |

OCTOBER 2001 - NOVEMBER (14)

WEB 31
ZOE'S BIRTHDAY
HOLLOWEEN
☑ 2 TASKS DUE TODAY

| Time | Event |
|---|---|
| 10AM | NAVEL REVIEW BOARD WEEKLY INSPECTION / ROSENCRANZ / 10:30-11:30AM |
| 11AM | ECLIENT STAF / BATCAVE / 9:30-10:30AM |
| NOON | |
| 1 PM | POSSIBLE COLLAB. W/ MICROSOFT /VADER'S LAIR / 1:00-2:00 PM |
| 2 PM | PRESENTATION COMMENTS TO PAUL IN HIS OFFICE |
| 3 PM | 1.1 WITH GREG 1; TITANIA / 8:00 — ENGINEERING REVIEW / PUMA / 3:00-4:00 PM |
| 4 PM | FACTORY CONFIG & DEPLOY ENGINEE.. |

TIME REQUESTS (12)

| LENGTH | FROM | TITLE |
|---|---|---|
| 1HR | BILL | BUDGET PROPOS... |
| 30 MIN | JIM | NEXT YEAR'S HIR... |
| 1 HR | SALLY | PROJECT XYZ |

METHOD AND SYSTEM FOR SCHEDULING A MEETING FOR A SET OF ATTENDEES VIA A SPECIAL ATTENDEE

RELATED APPLICATION

The present application is a divisional of and claims the benefit of priority of U.S. patent application Ser. No. 12/627,902, filed on Nov. 30, 2009, now U.S. Pat. No. 7,912,745 which is a continuation of U.S. patent application Ser. No. 10/155,625, filed on May 23, 2002, now U.S. Pat. No. 7,865,387.

BACKGROUND OF THE INVENTION

1. Technical Field

The invention relates to the scheduling of meetings. More particularly, the invention relates to a time request queue for scheduling a meeting with a hard-to-schedule person.

2. Description of the Prior Art

There are people in every organization with whom it is very difficult to schedule time. Typically, these people have administrative assistants that manage their time. Though group-scheduling software exists today, booking a meeting with these hard-to-schedule people typically requires contacting the administrative assistant by some alternate mechanism, such as telephone or email, and then requesting the meeting to be scheduled. This is not a big problem in isolation. But as many such meeting requests pile up, considerable time is spent by the administrative assistant in managing the requests and allotting time for each request. Should the scheduled time need to change, as it often does, a lot of time is spent trying to communicate the change of plans to those affected.

Currently, in group scheduling software a meeting organizer fills out a meeting request by proposing a date and time for the event to a list of attendees who, in turn, accept or decline the request. In all commercial group scheduling software today, the organizer is the only person who can set any detail of the meeting, i.e. the start time, the duration, the meeting title, the descriptive text, etc.

It would be advantageous to provide a group scheduling solution that offers an organized and formalized solution to the above described time management problem, in which the desired meeting includes one person who is difficult to schedule.

SUMMARY OF THE INVENTION

The presently preferred embodiment of the invention provides a group scheduling solution that offers an organized and formalized solution to the time management problem above mentioned, in which the desired meeting includes one person who is difficult to schedule. In the inventive approach, a scheduling system is provided in which a hard-to-schedule attendee takes over responsibility for setting the start time of an event.

In the invention, a workflow is provided as follows:
The organizer sends a request to the hard-to-schedule person. The request preferably contains the desired duration of the meeting. The request may contain a list of attendees, location, and other details.
These requests are maintained in a queue for the hard-to-schedule person. Batching requests in a queue is a key feature of the invention. The hard-to-schedule person, or their proxy, can then review these requests and select a suitable time for the meeting, set this time in a meeting request, thereby causing an update to be sent back to the organizer and the other attendees, thus indicating the appointed time for the meeting.
The organizer of the meeting can still update the meeting details, etc. However, any changes in the start time or the duration of the meeting must be made by the hard-to-schedule person or their proxy.
Note: The hard-to-schedule person can also decline the meeting entirely.

BRIEF DESCRIPTION OF THE DRAWINGS

FIG. 2 is an illustration of a screen display for a calendar and timer request queue according to the invention.

DETAILED DESCRIPTION OF THE INVENTION

Figure 1:
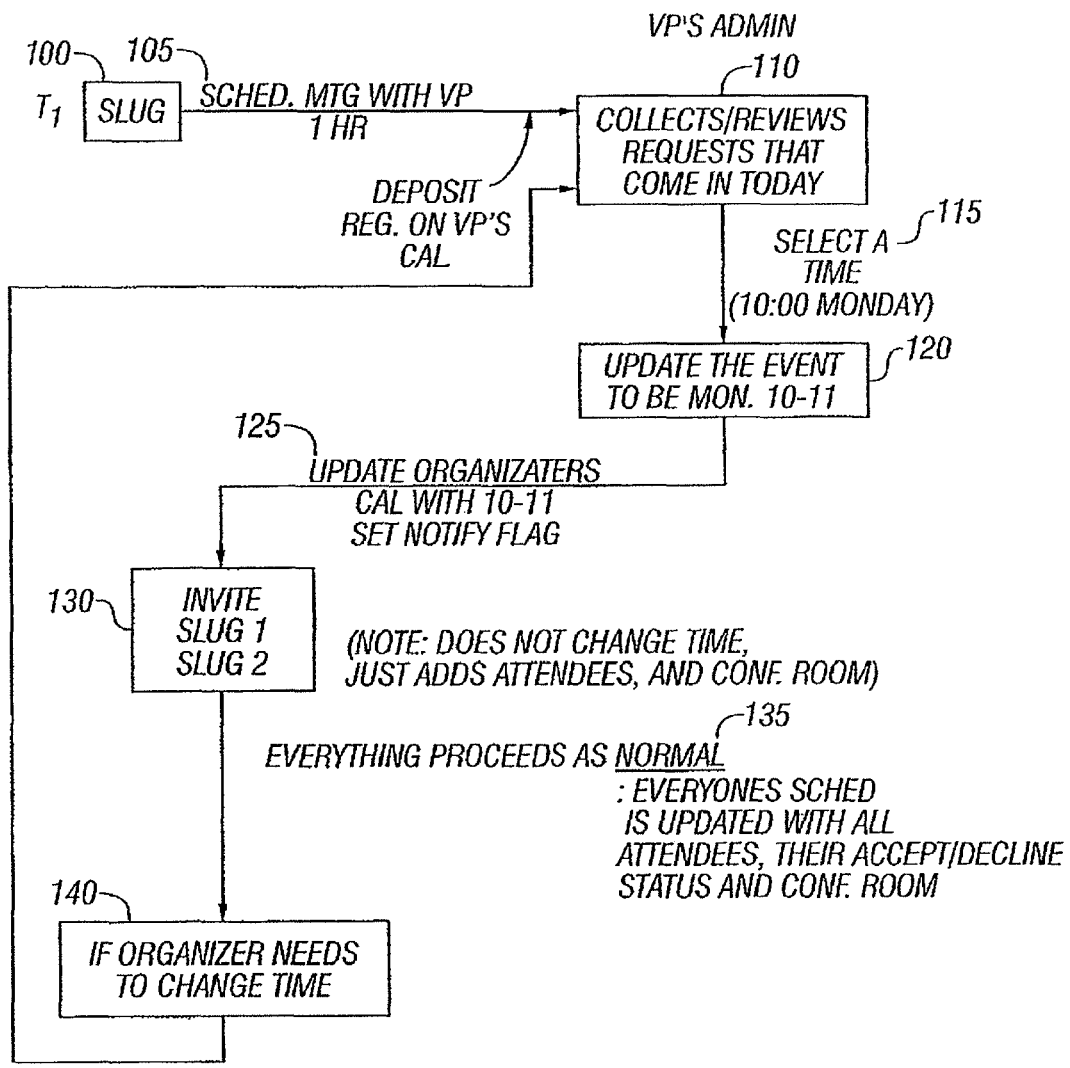
FIG. 1 is a flow diagram showing the scheduling of a meeting using a time request queue according to the invention.

The presently preferred embodiment of the invention replaces state of the art group scheduling software, in which a meeting organizer fills out a meeting request by proposing a date and time for the event to a list of attendees who, in turn, accept or decline the request, with a new approach in which the hard-to-schedule attendee takes over responsibility for setting the start time of the event.

FIG. 1 is a flow diagram showing the scheduling of a meeting using a time request queue according to the invention.

The preferred workflow is as follows:
The organizer 100 sends a request to the hard-to-schedule person 105, e.g. a vice president of the company. The request must contain the desired duration of the meeting, e.g. one hour. The request may contain the list of attendees, the location, and other details.
These requests are maintained in a queue for the hard-to-schedule person 110. The hard-to-schedule person, or their proxy, e.g. an administrative assistant, can then review these requests and select a suitable time for the meeting 115, e.g. 10:00 AM Monday, set this time in the meeting request 120, causing an update 125 to be sent back to the organizer and the other attendees indicating the appointed time 130.
The organizer of the meeting can still update the meeting details, etc. 130, for example to add attendees or change the conference room location of the meeting, and the meeting can proceed as scheduled 135. However, any change to the start time or duration of the meeting 140 must be made by the hard-to-schedule person, or their proxy 110.
The hard-to-schedule person can also decline the meeting entirely.

EXAMPLE

Step 1
Bill wants to set up a meeting with a couple of people on his team and with Joe, a hard-to-schedule vice-president. Bill goes into the calendar/scheduling program and creates the special time request. It is created very much like any other meeting, except that a specific start date/time is not set. Bill adds himself, his team, and Joe as attendees of the meeting. Bill indicates that the meeting will take one hour. Bill also marks Joe as a special attendee who can set the meeting time.
Step 2
After Bill creates the time request, it shows up on Joe's calendar. Time requests are collected and held until the attendee who can set the meeting time does so. FIG. 2 is an illustration of a screen display for a calendar and timer request queue according to the invention. On the left side 14 of the screen 10 is a view of two days, though it could be any of a variety of schedule views provided by calendar applications, such as a day, a week, or a month. It is shown as a reference to what meetings are currently scheduled.

On the right side 12 of the screen is a list of the time requests that have not yet been assigned a specific time. The list shows the length of time requested, the requester, and the title of the meeting. Bill's meeting is highlighted by clicking it. The meeting request could be dragged and dropped onto the left side of the screen to assign it to a particular time or it could be double-clicked to bring up a more detailed dialog box in which the time can be set. Once the time request has been assigned a timeslot, it moves out of the time requests list and into the schedule.

Step 3

Joe schedules the request for 11:30 on Wednesday, October 31. Once this is done, Bill is alerted that his time request has been scheduled. The meeting request now shows up in all the attendees' schedules at the appointed time.

Many variants of the invention are contemplated. For example, it is often the case that an administrative assistant handles the scheduling requests and manages the calendars of others. The time request queue can be managed by an administrative assistant. Another embodiment involves varying the specific details that the hard-to-schedule attendee can set. For instance, it may be that the in addition to the start time, the location for the meeting is also set by the hard-to-schedule attendee.

There are also other usage scenarios. For example, a person who wants to take his car in for a checkup. Typically, there are certain preferences that the repair shop has, such as the shop's hours of operation and/or workload, subject to some of the preferences of the person who is arranging to take in his car, such as the time of day of day of week. The invention is applicable to the scheduling of an appointment with the repair shop, or any other service. Thus, the person who desires an appointment for service need only submit a request to the time request queue, and an appointment is scheduled based upon the schedule of the service, or alternatively based upon the preferences of the customer. This could include such things as setting an appointment to get a hair cut, where the appointment must be Tuesday nights between certain times.

The invention seeks to satisfy the customer preferences and the service's schedule, relative to these criteria. Thus, the hard to schedule individual, for example a doctor, can set a time and/or place, but subject to various requirements of the requestor. In such case, the needs of both parties may not overlap and the meeting may not take place. In such case, the requestor may provide alternatives or may rank his preferences to help accommodate the needs of the difficult to schedule person. Further, the hard to schedule person may have some flexibility in his schedule and could provide the requester with one or more alternatives, such as different times, days, and/or locations. The invention also supports a collaborative agenda, where the hard to schedule person may receive a proposed agenda with the request, and in setting the meeting time and/or place, may include a revised agenda with the meeting notice sent to each attendee.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for scheduling a meeting for a set of recipients, wherein the set of recipients includes a special attendee and at least one additional attendee, the at least one additional attendee including a meeting organizer, the method comprising:

obtaining an initial meeting request from the meeting organizer, wherein the meeting request does not specify meeting commencement information, the meeting commencement information corresponding to a start time and a date;

generating a user interface for displaying the initial meeting request to the special attendee, wherein the user interface includes a meeting request queue displaying one or more selectable meeting requests, including the initial meeting request, which have not yet been assigned a specific start time and date, and wherein for each of the one or more selectable meeting requests, the user interface displays a requested duration and a meeting organizer associated with one of the selectable meeting requests;

collecting input designated by the special attendee from the user interface, wherein the input specifies the meeting commencement information;

transmitting the collected input;

generating an updated meeting request using the collected input, the updated meeting request designating the set of recipients and specifying the meeting commencement information, making a modification, initiated by the special attendee or a proxy of the special attendee, to the collected input designated by the special attendee that specifies the meeting commencement information, wherein only the special attendee or the proxy of the special attendee can initiate the modification, and wherein the meeting organizer can neither initiate nor make the modification; and causing transmission to the at least one additional attendee including the meeting organizer of an updated meeting request comprising the modification to the collected input, wherein the method is implemented by group scheduling software executed on a computer.

2. The method of claim 1, further comprising obtaining the updated meeting request.

3. The method of claim 1, wherein the initial meeting request includes an identification of the set of recipients designated to attend the meeting and wherein the collected input further includes a modification to the identification of the set of recipients.

4. The method of claim 1, wherein the initial meeting request is to be displayed in the meeting request queue until the meeting commencement information is collected.

5. The method of claim 1, wherein the user interface further includes a calendar display to be provided adjacent to the meeting request queue, the calendar display providing a reference to at least one of an available start time and an available date associated with the special attendee.

6. The method of claim 5, wherein collecting input designated by the special attendee from the user interface comprises identifying movement of the initial meeting request from the meeting request queue to the calendar display.

7. The method of claim 1, wherein the initial meeting request includes a meeting agenda and wherein the collected input further includes a modification by the special attendee to the meeting agenda.

8. The method of claim 7, wherein generating the updated meeting request comprises generating the updated meeting request including the modification by the special attendee to the meeting agenda.

9. The method of claim 1, wherein the initial meeting request is acceptable by the special attendee to place a calendar event on a calendaring application.

10. The method of claim 1, wherein the updated meeting request is acceptable by the special attendee to place a corresponding calendar event on the calendaring application.

11. The method of claim 1, further comprising:
obtaining from the special attendee a modification to the identification of the set of attendees responsive to the initial meeting request,
wherein generating the updated meeting request comprises generating the updated meeting request for distribution to the at least one additional attendee identified in the modified set of attendees and not the special attendee.

12. The method of claim 1, wherein generating the updated meeting request comprises automatically generating the updated meeting request in response to collecting the input designated by the special attendee, the input specifying the meeting commencement information.

13. The method of claim 1, further comprising causing distribution of the updated meeting request to only the at least one additional attendee and not the special attendee.

14. A system for scheduling a meeting for a set of recipients, wherein the set of recipients includes a special attendee and at least one additional attendee, the at least one additional attendee including a meeting organizer, the system comprising:
a computer executing group scheduling software, wherein upon execution of the group scheduling software, the computer is operable to:
obtain an initial meeting request from the meeting organizer, wherein the meeting request does not specify meeting commencement information, the meeting commencement information corresponding to a start time and a date;
generate a user interface for displaying the initial meeting request to the special attendee, wherein the user interface includes a meeting request queue displaying one or more selectable meeting requests, including the initial meeting request, which have not yet been assigned a specific start time and date, and wherein for each of the one or more selectable meeting requests, the user interface displays a requested duration and a meeting organizer associated with one of the selectable meeting requests;
collect input designated by the special attendee from the user interface, wherein the input specifies the meeting commencement information;
transmit the collected input;
generate an updated meeting request using the collected input, the updated meeting request designating the set of recipients and specifying the meeting commencement information,
make a modification, initiated by the special attendee or a proxy of the special attendee, to the collected input designated by the special attendee that specifies the meeting commencement information, wherein only the special attendee or the proxy of the special attendee can initiate the modification, and wherein the meeting organizer can neither initiate nor make the modification; and
cause transmission to the at least one additional attendee including the meeting organizer of an updated meeting request comprising the modification to the collected input.

15. The system of claim 14, wherein the initial meeting request includes an identification of the set of recipients designated to attend the meeting and wherein the collected input further includes a modification to the identification of the set of recipients.

* * * * *